United States Patent [19]

Dubrovsky

[11] Patent Number: 5,074,910
[45] Date of Patent: Dec. 24, 1991

[54] PROCESS FOR RECOVERING PRECIOUS METALS FROM SULFIDE ORES

[75] Inventor: Michael Dubrovsky, El Cerrito, Calif.

[73] Assignee: Chevron Research and Technology Company, San Francisco, Calif.

[21] Appl. No.: 489,736

[22] Filed: Feb. 28, 1990

Related U.S. Application Data

[63] Continuation of Ser. No. 123,746, Nov. 23, 1987, abandoned.

[51] Int. Cl.⁵ .............................................. C22B 11/12
[52] U.S. Cl. ......................................... 75/637; 75/634; 75/632; 75/633; 75/643; 75/648; 423/40; 423/39; 423/48; 423/46; 423/23; 423/147; 423/103
[58] Field of Search ................. 75/632, 633, 634, 637, 75/643, 648; 423/103, 147

[56] References Cited

U.S. PATENT DOCUMENTS

| | | |
|---|---|---|
| 490,193 | 1/1893 | French. |
| 589,959 | 9/1897 | Crooke. |
| 607,287 | 7/1898 | Sinding-Larsen. |
| 927,046 | 7/1909 | Hogel. |
| 1,049,746 | 1/1913 | Malm. |
| 1,185,817 | 6/1916 | Malm. |
| 1,364,804 | 1/1921 | Rankin. |
| 1,883,234 | 10/1932 | Lennox et al. |
| 2,895,796 | 7/1959 | Hill ........................................ 23/87 |
| 3,069,254 | 12/1962 | Queneau et al. ...................... 75/82 |
| 3,537,961 | 11/1970 | White et al. ....................... 204/107 |
| 3,652,219 | 3/1972 | Peters et al. ........................ 23/200 |
| 3,802,870 | 4/1974 | Bell ........................................ 75/82 |
| 3,825,651 | 7/1974 | Heinen et al. ...................... 423/44 |
| 3,834,896 | 9/1974 | Eisele et al. ....................... 75/112 |
| 3,880,650 | 4/1975 | Pemsler ................................ 75/72 |
| 3,894,927 | 7/1975 | Kane et al. ........................ 204/64 |
| 3,899,322 | 8/1975 | Yosim et al. ....................... 75/65 |

(List continued on next page.)

FOREIGN PATENT DOCUMENTS

5675538 6/1981 Japan.

OTHER PUBLICATIONS

Hundley et al., "Oxidation of Mixed Iron and Copper Chlorides", 1974 Report of Investigations.
Delarue, "Behavior of Oxides and of Metal Sulfides in LiCl-KCl Molten Eutectic", 44 Chimie Analytique (1962).
Campbell et al., "Applications of Chloride Metallurgy to Base Metal Sulfide and Uranium Ores at Canmet", Extractive Metallurgy Proceedings, pp. 76-90 (1981).
Yee et al., "Chlorination of Chalcopyrite", Bureau of Mines Report of Investigation 8229, U.S. Dept. of Interior (1977).
Mukhergee et al., "Base Metal Resource Processing by Chlorination", vol. 1, Minerals Process Technology Review, 111 (1983).
Titi-Manyaka et al., "Thermogravimetric Investigation of Chlorination Behaviors of Some Common Metals and their Oxides", and Chlorination Behaviors of Some Metal Sulfides as Investigated by Thermogravimetric Analysis, Society of Mining Engineers, vols. 252 and 254, pp. 307-314 and 37-42 (1972 and 1973), respectively.
Rivarola et al., "Recovery of Platinum from Spent Catalysts of Naphtha Reforming", Lat. Am. J. Chem. Eng. Appl. Chem. 11, pp. 47-52 (1981).

(List continued on next page.)

Primary Examiner—Aaron Weisstuch
Assistant Examiner—Edward Squillante
Attorney, Agent, or Firm—T. G. DeJonghe; V. J. Cavalieri

[57] ABSTRACT

The present invention is a process to recover precious metals from sulfide ores. It involves chlorinating a mixture of an ore concentrate and salt to form a liquid melt. The salt preferably contains potassium chloride. This chlorination is carried out at a temperature between 300° and 600° C. while stirring. The process converts precious metals in the elemental and sulfide forms into precious metal chlorides which are recovered by subsequent processing steps.

25 Claims, 1 Drawing Sheet

U.S. PATENT DOCUMENTS

| | | | |
|---|---|---|---|
| 3,938,989 | 2/1976 | Bell et al. | 75/82 |
| 3,966,888 | 6/1976 | Braithwaite et al. | 423/498 |
| 3,979,265 | 9/1976 | Fonseca | 204/105 |
| 3,983,224 | 9/1976 | Allain et al. | 423/498 |
| 3,988,415 | 10/1976 | Barr | 423/22 |
| 3,988,417 | 10/1976 | Polinsky | 423/40 |
| 3,992,307 | 11/1976 | Cardwell et al. | 423/51 |
| 3,994,720 | 11/1976 | Dubeck | 423/32 |
| 4,011,146 | 3/1977 | Coltrinari et al. | 423/38 |
| 4,038,066 | 7/1977 | Bell et al. | 75/29 |
| 4,110,106 | 8/1978 | Frankiewicz | 75/1 R |
| 4,144,056 | 3/1979 | Kruesi | 75/111 |
| 4,179,492 | 12/1979 | Kruesi | 423/263 |
| 4,209,501 | 6/1980 | Kruesi | 423/491 |
| 4,248,838 | 2/1981 | Allain et al. | |
| 4,353,740 | 10/1982 | Dunn | 75/83 |
| 4,362,607 | 12/1982 | Ritcey et al. | 204/108 |
| 4,420,038 | 12/1983 | Ducati | 204/66 |
| 4,500,498 | 2/1985 | Kruesi et al. | 423/100 |
| 4,551,213 | 11/1985 | Wilson | 204/111 |
| 4,576,812 | 3/1986 | Von Hahn | 423/491 |
| 4,612,171 | 9/1986 | Holmstrom | 423/22 |
| 4,613,365 | 9/1986 | Berg et al. | 75/83 |

OTHER PUBLICATIONS

Palmer et al., "Recovery of Gold by High-Temperature Chlorination", Proceed. of the Reinhardt Schuman Intl. Symp. pp. 211–230, Published by Metallurgical Society (1986).

Yoshinaga et al., "Tec-Kowa Pelletizing Chlorination Process, Its Establishment and Development", Proceed. of Complex Sulfide Ores, edited by Zunkel et al., Aime, pp. 221–238.

Engel et al., "Chloride Volatilization and Other Tests on a Gold-Copper Ore", Report 4612, U.S. Dept. Int. (Dec. 1949).

Monk et al., "Purification of Zinc Chloride Produced by Chlorination of Zinc Sulfide Ores", 82 Section C of the Trans. of the Inst. of Mining and Metall. 161, 162 (1973).

PROCESS FOR RECOVERING PRECIOUS METALS FROM SULFIDE ORES

This application is a continuation, of application Ser. No. 123,746, filed Nov. 23, 1987 now abandoned.

BACKGROUND OF THE INVENTION

The present invention is a process for the recovery of precious metals from sulfide ores. More specifically, the process of the present invention relates to the conversion of precious metal sulfides to metal chlorides and subsequent recovery of the precious metals.

Worldwide there are many ores in which precious and/or base metals are finely intergrown, dispersed or encapsulated within complex sulfide ores. The extraction of metals from these types of ores is either very complicated, expensive, or otherwise not feasible by conventional technology. Thus, incentives exist to develop a process that may economically process such ores.

Precious metal ores that contain platinum group metals (PGMs) are usually associated with sulfide minerals of copper, nickel, and iron. Conventionally, these ores are smelted to separate the sulfide minerals from the gangue. Upon smelting, the sulfide minerals and the precious metals collect in a separate molten phase known as matte while the gangue separates as a molten slag. After smelting the slag is discarded, the matte is cooled, crushed, ground, and leached with sulfuric acid in an autoclave to remove the base metals. The remaining solid residue, often referred to as "leach residue", is further leached with hydrochloric acid and chlorine to recover the precious metals. This process suffers from at least the following major disadvantages: (1) it generates sulfur dioxide which requires expensive gas treating equipment to limit atmospheric emissions; (2) it is long and tedious; and (3) it does not completely dissolve leach residue which must be resmelted.

Other precious metal ores (besides PGMs) that are difficult to treat are gold and silver refractory ores. In refractory gold ores the gold is finely disseminated in a pyritic mineral and cannot be treated by conventional methods, the easiest example of which is direct cyanidation. The gold ore must be treated first. For example, the ore is roasted or leached in an autoclave under oxygen pressure to fully oxidize pyrites. Then, the solid residue from the roasting can be leached with cyanide solutions to recover gold. Depending on the ore and the success of the roasting or autoclaving, gold recovery may vary between 80-95%.

Base metals within sulfide ores can also be recovered by chlorination. Generally, metals recovery processes that employ chlorination reactions break down into three groups: gaseous chlorination; salt chlorination (in the absence of chlorine gas): or chlorination in a molten salt bath in the presence of chlorine gas. For example, U.S. Pat. Nos. 4,011,146 to Coltrinari et al and 4,362,607 to Ritcey et al. teach gaseous chlorination; U.S. Pat. No. 1,883,234 teaches chlorination by salt addition; and U.S. Pat. No. 4,209,501 to Kruesi discloses a molten salt extraction. Furthermore, chlorination has also been suggested for some precious metal recovery, see U.S. Pat. Nos. 4,353,740 to Dunn; 3,825,651 to Heinen et al., 3,988,415 to Barr and Kruesi '501.

As explained in H. Parson's "Low Temperature Dry Chlorination of Sulfide Ores—A Review," CIM Bull. Vol. 71, 196 (March 1978), the reaction between chlorine gas and metal sulfides has been known at least since the early part of the century. For example, see U.S. Patent No. 1,388,086 issued August 16, 1921 to Ashcroft. Many researchers have since tried to create commercial processes. They hoped that gaseous chlorination would enable them to: (1) treat complex sulfide ores; (2) produce elemental sulfur; and (3) use less energy.

However, there are some problems inherent in gaseous chlorination processes, e.g., (1) it is difficult to produce separate metal chloride products (2) metal chlorides fuse with the solid residue and cause plugging of the chlorination reactor, (3) sulfur chlorides form, (4) both the metal chloride and the sulfur vapors are difficult to separate and recover, (5) the reaction produces large volumes of gases which cause large losses of concentrate dust, (6) there is poor recovery, and (7) equipment corrodes.

The second process, chlorination with salt in the absence of chlorine gas, dates back to the 19th Century, for example, see U.S. Pat. No. 589,959 issued Sept. 14, 1897 to Crooke. It also has difficulties. For example, the process uses high temperatures (900°-1000° C.) and requires more energy. Furthermore, at these temperatures the metal chlorides are volatilized and a gas scrubber system is required for their subsequent recovery.

The use of a molten salt bath, the third process, can be advantageous. However, the prior art contains certain problems. For example, (1) large quantities of added metal chlorides are required to form a molten bath, (2) certain metal chlorides are volatilized and lost during chlorination, and (3) large quantities of gangue are not tolerated.

Furthermore, concentrating precious metal ores can lead to metal losses. Prior art processes typically require additional concentrating because precious metals exist in low ore concentrations. This loss due to additional concentrating is less acceptable for precious metals than other metals because precious metals are more valuable. Consequently, it is desirable to minimize precious metals loss due to ore concentration As a result, there is a need for a process which can overcome the disadvantages of the prior art and can efficiently recover high quantities of precious metals.

SUMMARY OF THE INVENTION

According to the present invention, a process is provided for extracting precious metals from sulfide ores. The process comprises contacting a precious metal containing sulfide ore with a salt, which contains potassium chloride, to produce an ore/salt mixture; contacting the ore/salt mixture with a chlorine-containing gas at a temperature between 300° and 650° C. in the presence of a promoter to form a liquid melt without substantially volatilizing precious metal chlorides; and recovering the precious metals. Preferably the sulfide ore contains a promoter such as iron or copper. It is also preferred that the liquid melt comprise greater than 40% liquid which is preferably stirred.

Among other factors, the present invention is based on my finding that surprisingly high metal recoveries from a bulk precious metal sulfide ore concentrate are achieved in my process which involves treating salt and ore concentrate with chlorine gas at a temperature between 300° and 650° C. In the process, precious metals are retained in the liquid melt and losses due to volatilization are minimized. This high recovery is achieved without: pre-oxidizing or roasting the ore concentrate;

adding a relatively large amount of salt; or heating to a relatively high temperature. I have also discovered that stirring improves metals extraction and decreases gangue foam. If this foam is decreased, then ore concentrates having a high percent gangue (greater than 20%) can be used. This is advantageous because the ore requires less concentrating, which minimizes precious metals loss during the concentration step.

Additionally, because the process uses relatively low temperatures and potassium chloride, there is essentially no loss of normally volatile metal chlorides, such as chlorides of iron, copper, lead, gold, etc. They are retained within the reactor in the liquid melt.

A preferred process of the present invention comprises contacting an ore, which contains elemental and sulfidic metals selected from the group of: platinum group metals, gold, silver, iron, or copper, with salt, which contains greater than 60% potassium chloride, in the substantial absence of added promoter metal chlorides to produce an ore/salt mixture having a salt to metals molar ratio between 1.0 and 1.5; contacting the mixture with chlorine at a temperature between 350° C. and 460° C. to form a liquid melt without substantially volatilizing precious metal chlorides; stirring the liquid melt; and recovering the precious metals by leaching.

DETAILED DESCRIPTION OF THE INVENTION

Figure 1:
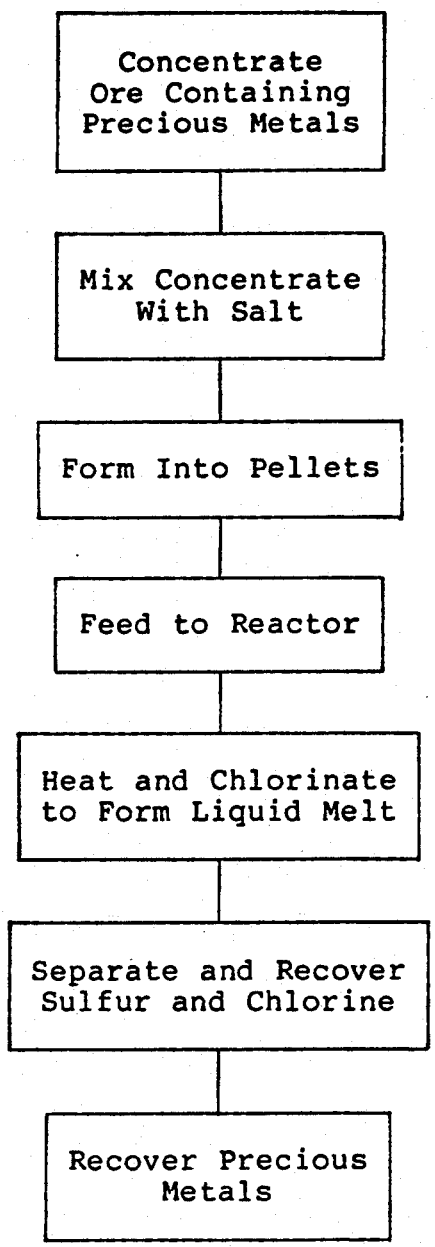
FIG. 1 shows a preferred flow scheme for the present invention. It includes the sequential steps of: concentrating ore which contains precious metals; mixing the ore concentrate with salt; pelletizing the ore/salt mixture; feeding the pellets to a reactor; heating and chlorinating the pellets to form a liquid melt; separating and recovering sulfur and chlorine; and recovering precious metal chlorides.

The process of the present invention converts precious metals, in an ore, to chlorides. As chlorides, they can be readily recovered and purified in subsequent processing steps. These precious metals are typically found in complex sulfide ores, refractory gold ores, or their concentrates.

In this application, platinum group metals (PGMs) are defined as: platinum, palladium, rhodium, iridium, ruthenium, and osmium. Precious metals are defined as the PGMs plus gold and silver.

The types of ores and ore concentrates that can be treated by the process of the present invention are those in which precious and platinum group metals are found in sulfidic or elemental states. They can be mixed with iron or copper sulfides, oxides, or silicates and ores containing compounds of these metals. Minerals which can be treated in accordance with the process of the present invention include pentlandite, pyrrhotite, chalcopyrite, bornite, chalcocite, covellite, cubanite, pyrite, arsenopyrite, sphalerite, galena, millerite, niccolite, stannite, argentite, alabandite, molybdenite, stibnite, pyrargyrite, enargite, calaverite, etc.

In industrial processes, a concentrate is typically preferred over a raw ore (although a raw ore could be used if the metal concentration was high). Typically, the raw ore is ground to less than 100 mesh and a bulk concentrate is formed by conventional ore dressing, for example, flotation. When "ore concentrate" is used in this specification it is used as a convenience to include both "ore" and "ore concentrate". The concentrate may contain a relatively high percentage of gangue, e.g., greater than 20%, since the process is effective at high gangue levels. Typical concentrates can contain between 0.5 and 40% gangue.

This finely ground ore concentrate containing the metal sulfides and elemental metals is combined in an intimate admixture with the solid salt to form an ore/salt mixture. Preferably, the ore concentrate and salt are mixed together and pressed into pellets which reduces dust. Pelletizing methods are known to those skilled in the art. Alternatively, the ore concentrate and salt can be mixed as flowable solids prior to, as they enter, or during heating and chlorination.

For purposes of this invention, the word "salt" encompasses sodium chloride, potassium chloride, rubidium chloride, cesium chloride, or mixtures thereof. Preferably, the salt comprises greater than 40% potassium chloride, more preferably greater than 50% potassium chloride, most preferably greater than 60% potassium chloride. The remainder can consist of the other three salts. Potassium chloride is preferred because it lowers the viscosity of the liquid melt, reduces the volatility of the formed metal chlorides and is economical.

The ratio of ore to salt is important to achieve high metals recovery, to ease process handling, and to lower the metal chloride vapor pressures Insufficient salt creates a need for excess melting heat which causes some of the volatile metal chlorides to be lost overhead. However, too much salt creates a paste-like mixture that is difficult to stir. It is preferable to add enough salt so that the molar ratio of salt to metals in the ore concentrate is between 0.5 and 3, more preferably between 1 and 1.5.

The ore/salt mixture is heated and contacted with a chlorine-containing gas, in the substantial absence of $O_2$. The chlorine containing gas is preferably 100% chlorine gas, however, chlorine-containing compounds such as carbon tetrachloride, sulfur monochloride, hydrogen chloride, etc. can also be used. The amount of chlorine gas is at least stoichiometrically equal to the sulfidic sulfur in the ore concentrate. It is important to add enough chlorine to overchlorinate all the reactive metal sulfides and elemental metals. This is important because the precious metals will form precious metal chlorides only after substantially all the metal sulfides have been converted. Precious metal chlorides convert back to precious metal sulfides upon contact with any other metal sulfides. The metal chlorides that are formed include, but are not limited to: $ZnCl_2$, $PtCl_2$, $PtCl_4$, $PdCl_2$, $AuCl$, $AuCl_3CuCl$, $CuCl_2$, $FeCl_2$, $FeCl_3$, $PbCl_2$, $NiCl_2$, $MgCl_2$, $CoCl_2$, $MnCl_2$, $AgCl$, $RhCl_2$, $CdCl_2$, and $IrCl_2$.

During chlorination the temperature is preferably between 300° C. (572° F.) and 650° C. (1022° F.), more preferably between 350° C. and 460° C., and most preferably between 420° C. and 460° C. depending on the ore/salt mixture. These temperatures are generally lower than prior art temperatures which can volatilize metal chlorides.

Preferably, the ore/salt mixture will form a liquid melt at the process temperatures. Preferably, at least 40% of the liquid melt is liquid, more preferably at least 50% is liquid, most preferably at least 60% is liquid. It is important to provide enough liquid melt to react the precious metals with the salt, promoters, and chlorine to form precious metal chlorides. It is also important to form enough liquid melt so that it can be stirred easily. This is difficult if the percent liquid melt is below 40%.

The ore concentrate typically includes a promoter which is required in this process. Examples of preferred promoters are: iron, copper, and zinc. More preferable promoters are iron or copper. These promoters typically exist as sulfides and are relatively easy to chlorinate. They are formed in situ.

If there is insufficient liquid melt or a low promoter concentration, then more metal sulfides (e.g., from pyrite or chalcopyrite ore) may be added to form more metal chlorides and promoters in situ. This is especially advantageous because metal sulfides are relatively inexpensive compared to metal chlorides. Nonetheless, promoter metal chlorides can be added. When promoter metal chlorides are added, it is preferred to add them in a weight ratio of less than twice the amount of salt, more preferably less than an equivalent amount of salt, most preferably they are not added.

Without wishing to be bound by theory it is thought that when the ore/salt mixture is contacted with chlorine and heated, a liquid melt forms to provide a medium for reaction between the metal sulfides, the elemental metals, the promoters, and chlorine. The easier to chlorinate promoter metal sulfides are converted quickly to metal chlorides which assist the precious metal chlorination. It is thought that potassium chloride is especially useful as it retains precious metals in the melt for subsequent processing, thereby increasing precious metal recovery. Many prior art methods intentionally or unintentionally volatilize precious metal chlorides which results in their loss. It is also thought that potassium chloride reduces the volatility of the promoter metal chlorides and keeps them in contact with the metal sulfides and elemental metals that have to be chlorinated.

The ore/salt mixture is chlorinated and heated in a reactor. Preferably, the reactor has a means for introducing the chlorine-containing gas into the ore/salt mixture or the melt, a means to admit the ore/salt mixture, a means for stirring or mixing, a means for heating, a means for removal of gases and liquids, as well as all the necessary process control equipment that is known in the art. The stirring means is preferably capable of keeping gangue foam well dispersed in the liquid melt as well as providing a dynamic environment for contact between the salt, elemental metals, metal sulfides, metal chlorides, and chlorine gas.

Stirring the liquid melt improves metal extraction and reduces gangue foam which enables the operator to use an ore concentrate that has a higher concentration of gangue. This is advantageous because it is not necessary to highly concentrate the ore and results in saving precious metals that are normally lost during the additional concentration steps. Consequently, the liquid melt preferably contains greater than 20% gangue, or more preferably greater than 40% gangue, which is higher than processes of the prior art.

During chlorination, elemental sulfur is evolved and condensed. This is particularly advantageous over current smelting technologies which produce sulfur dioxide gas, because elemental sulfur can be easily stored and shipped. Solid sulfur does not pose an air pollution problem, as does sulfur dioxide. Furthermore, some hazardous elements advantageously evolve with the sulfur (as chlorides) and are removed from the ore/salt mixture. The hazardous elements are not vented to the air, they are typically removed with the sulfur or are scrubbed out. They include: arsenic, tellurium, antimony, selenium, and bismuth. An example of a scrubber is an aqueous hydroxide solution (such as an aqueous solution of alkali or alkaline earth metal hydroxides) or the feed sulfide ore concentrate itself.

After substantially all the precious metals are formed into precious metal chlorides, they can be recovered by means known in the art, such as brine leaching. U.S. Ser. No. 80,023 discloses several exemplary methods for metals recovery and others are known to those skilled in the art.

The process of the present invention may be operated in the batch mode or the continuous mode. In a continuous mode, one continuous flow reactor may be used or several similar reactors may be connected in series. In a batch mode, a reactor with an adequate volume may be used to effectively process the ore.

The following examples are presented here as specific embodiments of the overall concept of the invention. It is intended that they be exemplary and not limiting in any way.

EXAMPLES

EXAMPLE 1

One hundred (100) grams concentrate is mixed with 50 grams potassium chloride and formed into pellets which are added to a reactor. The concentrate contains 600 grams/ton platinum, 2500 grams/ton palladium, 25 grams/ton gold, 6% copper, 4% nickel, 20% iron, and 17% sulfur. The reactor containing the pellets is heated to 450° C. Chlorine is contacted with the pellets in the reactor at a rate of 1 liter/minute while stirring. The reaction is stopped at about 17 minutes. High metal recoveries are obtained.

EXAMPLE 2

One hundred (100) grams precious metal concentrate is mixed with 24.3 grams of high grade chalcopyrite concentrate. The precious metal concentrate contains 500 grams/ton platinum, 2400 grams/ton palladium, 20 grams/ton gold, 3% copper, 4% nickel, 5% iron, and 6.1% sulfur. The chalcopyrite concentrate contains 38% sulfur, 38% copper, and 26% iron. Fifty (50) grams of potassium chloride is added to the precious metal and chalcopyrite concentrates and pellets are formed which are added to a reactor. The reactor is heated and chlorine is contacted with the pellets (at a rate of approximately 1 liter/minute) while they are stirred. The reaction is stopped after about 18 minutes. High metal recoveries are obtained.

EXAMPLE 3

A mixture of 100.6 grams concentrate and 50 grams potassium chloride were formed into pellets. The concentrate contained 506.7 grams/ton platinum, 2370 grams/ton palladium, 22 grams/ton gold, 2.9% copper, 3.62% nickel, 13.7% iron, 11.5% sulfur, and 35.8% silicon oxide. Two Hundred (200) grams high quality coarse sand were placed in a reactor to facilitate stirring and heat transfer. The particle size of the sand was between −20 mesh and +30 mesh. The reactor consisted of a glass stirred resin kettle. The top cover of the reactor had an opening for a hollow shaft stirrer, and openings for solids, gas exit, and measurement equipment. The reactor was purged with nitrogen through the hollow shaft of the stirrer and heated to 450° C. while stirring. Then, 68 grams of the pellets were fed into the reactor and chlorine was introduced at 20 cc/minute. The rest of the solids were fed to the reactor in two 20-minute intervals. Chlorine was added until it was detected in an absorbent solution for the exit gas, using an Eh electrode to measure the oxidation potential. Typically this occurred when the Eh potential rose from approximately 300 mv to greater than 1,000 mv. This took approximately one hour. After chlorination the reactor was purged with nitrogen and cooled to room temperature. After cooling the metals were recovered by aqueous leaching. Metal extractions were: 98.4% platinum, 99.7% palladium, 4.7% gold, 99.9% copper, 99.9% nickel, 99.6% sulfur, and 81.2% iron.

EXAMPLE 4

This example shows the importance of stirring.

A mixture of 2062 grams of precious metal concentrate and 630 grams KCl were formed into pellets. The precious metal concentrate contained 200 grams/ton platinum, 745 grams/ton palladium, 14 grams/ton gold, 1.5% copper, 2.1% nickel, 9.1% iron, and 5.65% sulfur. The pellets were added to a reactor containing 80 grams KCl and 100 grams CuCl. The reactor was purged with 1 liter/minute nitrogen for several hours and heated to 500° C. Chlorine was introduced at the bottom of the reactor at a rate of 1 liter/minute. Chlorine breakthrough was detected in 10 minutes. A total of 647 grams of chlorine was introduced into the reactor (approximately 5 hours), but no appreciable melt was formed.

The embodiments of this invention which are exemplified above are intended solely as illustrations of the invention. They should not be interpreted as limiting the scope of the invention to just those features which are shown or disclosed. As those familiar with this area of research will appreciate, there are numerous variations of the invention as defined in the following claims which may not have been exemplified, but will achieve equivalent results.

What is claimed is:

1. A process for extracting precious metals from sulfide ore, comprising:
   contacting a precious metal-containing sulfide ore with salt, which contains potassium chloride, to produce an ore/salt mixture;
   contacting the ore/salt mixture;
   contacting the ore/salt mixture with a chlorine containing gas at a temperature between 300° and 650° C. in the presence of a promoter to form a liquid melt without substantially volatilizing precious metal chlorides, the amount of chlorine added being such as to overchlorinate reactive metal sulfides and elemental metals; and
   recovering the precious metals.

2. A process for extracting precious metals from sulfide ore in accordance with claim 1 wherein the promoter is selected from the group consisting of iron or copper.

3. A process for extracting precious metals from sulfide ore in accordance with claim 2 wherein the promoter is contained in the sulfide ore.

4. A process for extracting precious metals from sulfide ore in accordance with claim 1 further comprising stirring.

5. A process for extracting precious metals from sulfide ore in accordance with claim 1 wherein the liquid melt contains greater than 20% gangue.

6. A process for extracting precious metals from sulfide ore in accordance with claim 1 wherein the liquid melt comprises greater than 40% liquid.

7. A process for extracting precious metals from sulfide ore in accordance with claim 1 wherein the liquid melt comprises greater than 50% liquid.

8. A process for extracting precious metals from sulfide ore in accordance with claim 1 wherein the salt contains greater than 40% potassium chloride.

9. A process for extracting precious metals from sulfide ore in accordance with claim 1 wherein the salt comprises greater than 50% potassium chloride.

10. A process for extracting precious metals from sulfide ore in accordance with claim 1 wherein the salt further comprises a salt selected from the group of sodium chloride, cesium chloride, and rubidium chloride.

11. A process for extracting precious metals from sulfide ore in accordance with claim 1 further comprising adding promoter metal chlorides in a weight ratio of less than twice the amount of salt.

12. A process for extracting precious metals from sulfide ore in accordance with claim 1 further comprising adding promoter metal chlorides in a weight ratio of less than an equivalent amount of salt.

13. A process for extracting precious metals from sulfide ore in accordance with claim 1 wherein the ore/salt mixture is chlorinated in the absence of added promoter metal chlorides.

14. A process for extracting precious metals from sulfide ore in accordance with claim 1 wherein the salt to metals molar ratio is between 0.5 and 3.

15. A process for extracting precious metals from sulfide ore in accordance with claim 14 wherein the salt to metals molar ratio is between 1 and 1.5.

16. A process for extracting precious metals from sulfide ore in accordance with claim 1 wherein additional metal sulfides are added to the liquid melt to increase the percent liquid.

17. A process for extracting precious metals from sulfide ore in accordance with claim 16 wherein the metal sulfides are selected from the group consisting of iron sulfide, copper sulfide, lead sulfide, zinc sulfide, nickel sulfide, cobalt sulfide, or mixtures thereof.

18. A process for extracting precious metals from sulfide ore in accordance with claim 1 wherein the temperature is between 350° and 460° C.

19. A process for extracting precious metals from sulfide ore in accordance with claim 1 wherein the ore/salt mixture is formed into pellets prior to contact with the chlorine-containing gas.

20. A process for extracting precious metals from sulfide ore in accordance with claim 1 wherein the precious metals are recovered by leaching.

21. A process for extracting precious metals from sulfide ore in accordance with claim 1 wherein the precious metals are selected from the group of platinum group metals, gold, and silver.

22. A process for extracting precious metals from sulfide ore in accordance with claim 1 wherein the chlorine-containing gas is chlorine.

23. A process for extracting precious metals from sulfide ore, comprising:
   contacting an ore, which contains elemental and sulfidic metals selected from the group of: platinum group metals, gold, silver, iron, or copper, with salt, which contains greater than 60% potassium chloride, in the substantial absence of added promoter metal chlorides to produce an ore/salt mixture having a salt to metals molar ratio between 1 and 1.5;

contacting the mixture with chlorine at a temperature between 350° and 460° C. to form a liquid melt without substantially volatilizing precious metal chlorides, the a mount of chlorine added being such as to overchlorinate reactive metal sulfides and elemental metals; and recovering the precious metals by leaching.

24. A process for extracting precious metals from sulfide ore in accordance with claim 23 wherein the ore/salt mixture of salt and ore is formed into pellets prior to contact with chlorine.

25. A process for extracting precious metal sulfide ore in accordance with claim 23 wherein the melt contains greater than 40% gangue.

* * * * *